UNITED STATES PATENT OFFICE.

EDMUND M. FLAHERTY, OF PARLIN, NEW JERSEY, ASSIGNOR TO E. I. DU PONT DE NEMOURS AND COMPANY, OF WILMINGTON, DELAWARE, A CORPORATION OF DELAWARE.

ANESTHESIA ETHER AND PROCESS OF MAKING THE SAME.

1,312,475.     Specification of Letters Patent.     Patented Aug. 5, 1919.

No Drawing.     Application filed February 18, 1918. Serial No. 217,753.

*To all whom it may concern:*

Be it known that I, EDMUND M. FLAHERTY, of Parlin, in the county of Middlesex, and in the State of New Jersey, have invented a certain new and useful Improvement in Anesthesia Ether and Processes of Making the Same, and do hereby declare that the following is a full, clear, and exact description thereof.

My invention relates particularly to an improved type of anesthesia ether and a process of making the same.

The object of my invention is to provide a process of producing anesthesia ether (that is to say, ethyl ether which is used for the purpose of producing anesthesia), which is substantially free from aldehydes, the deleterious bodies that are ordinarily present, and the product produced thereby.

The object of my invention is, furthermore, to provide a process whereby an ether is obtained which will stand a test with Nessler's solution,—a test which ethers previously produced for use in anesthesia would not stand.

Previously ether has been treated with an alkali to remove the deleterious constituents by boiling the ether with a water solution of an alkali, but in this process a quantity of ether was lost, and, furthermore, the ether took up or dissolved a large quantity of the water under the conditions present. The object of my invention is to avoid these disadvantages.

Further objects of my invention will appear from the detailed description thereof contained hereinafter.

While my invention is capable of embodiment in many different forms, for the purpose of illustration I shall describe only one form of the same herein.

For example, 100 c. c. of ether are washed with 20 c. c. of cold water and thereafter with 20 c. c. of a cold water solution of caustic soda having a strength of 10%, NaOH. Then the ether is distilled and the vapor of the ether is passed over solid caustic soda.

The product thus obtained will stand the test of contact with solid caustic potash for more than 98 hours without turning the caustic potash yellow.

Furthermore, the ether thus obtained will stand a test with Nessler's solution without showing any reaction, which is not true of any ether previously produced, so far as I am aware.

While I have described my invention above in detail, I wish it to be understood that many changes may be made therein without departing from the spirit of the invention.

I claim:

1. The process which comprises purifying ether by applying thereto a cold aqueous solution of an alkali and then passing the vapor of the ether over solid caustic soda.

2. The process which comprises purifying ether by applying thereto a cold aqueous solution of caustic soda and then passing the vapor of the ether over solid caustic soda.

3. The process which comprises purifying ether by applying thereto first cold water, then a cold aqueous solution of an alkali and then passing the vapor of the ether over solid caustic soda.

4. The process which comprises purifying ether by applying thereto first cold water, then a cold aqueous solution of caustic soda and then passing the vapor of the ether over solid caustic soda.

In testimony that I claim the foregoing I have hereunto set my hand.

EDMUND M. FLAHERTY.

Witnesses:
    G. WM. FREEMAN,
    WALTER S. HOLMES.